(12) United States Patent
Coulter et al.

(10) Patent No.: US 8,359,599 B2
(45) Date of Patent: Jan. 22, 2013

(54) METHODS AND SYSTEMS FOR EFFICIENT USE AND MAPPING OF DISTRIBUTED SHARED RESOURCES

(75) Inventors: Justin J. Coulter, Longmont, CO (US); John T. Varga, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 1223 days.

(21) Appl. No.: 11/943,518

(22) Filed: Nov. 20, 2007

(65) Prior Publication Data

US 2009/0133021 A1    May 21, 2009

(51) Int. Cl.
*G06F 9/46* (2006.01)
(52) U.S. Cl. .......................................... 718/104
(58) Field of Classification Search .................. None
See application file for complete search history.

(56) References Cited

U.S. PATENT DOCUMENTS

| | | | | |
|---|---|---|---|---|
| 5,546,586 A * | 8/1996 | Wetmore et al. | ............... | 717/122 |
| 5,652,711 A * | 7/1997 | Vennekens | .................... | 358/1.17 |
| 6,131,113 A * | 10/2000 | Ellsworth et al. | ............. | 709/213 |
| 6,578,069 B1 * | 6/2003 | Hopmann et al. | ............ | 709/203 |
| 6,944,642 B1 * | 9/2005 | Hopmann et al. | ............ | 709/203 |
| 7,487,319 B2 * | 2/2009 | Benhase et al. | ............... | 711/170 |
| 7,689,999 B2 * | 3/2010 | Garms et al. | ................... | 718/104 |
| 2002/0052910 A1 * | 5/2002 | Bennett et al. | ................ | 709/104 |
| 2002/0181001 A1 * | 12/2002 | Klosterman et al. | ......... | 358/1.11 |
| 2004/0196496 A1 * | 10/2004 | Klassen | ........................ | 358/1.15 |
| 2005/0246710 A1 * | 11/2005 | McLuckie et al. | ............ | 718/104 |
| 2006/0117320 A1 * | 6/2006 | Garms et al. | ................... | 718/105 |
| 2006/0238800 A1 * | 10/2006 | Czudak et al. | ............... | 358/1.15 |
| 2008/0195675 A1 * | 8/2008 | Torrent et al. | ................. | 707/204 |
| 2008/0244596 A1 * | 10/2008 | Mansker et al. | .............. | 718/104 |
| 2009/0070560 A1 * | 3/2009 | Meng et al. | .................... | 712/216 |

OTHER PUBLICATIONS

"Data Structures for Parallel Resource Management" Jit Biswas and James C. Browee, IEEE Transactions on Software Engineering, vol. 19, No. 7, Jul. 1993.
"Asynchronous Resource Management", Suvas Vajracharya and Daniel Chavarria-Miranda, IEEE Transactions on Software Engineering, 2001.
"Asynchronous Operations and Web Services, Part 3: Add business semantics to Web Services", Holt Adams, IBM jstart, Oct. 1, 2002.

* cited by examiner

*Primary Examiner* — Emerson Puente
*Assistant Examiner* — Hiren Patel
(74) *Attorney, Agent, or Firm* — Duft Bornsen & Fishman, LLP (57) ABSTRACT

Methods and systems for coordinating sharing of resources among a plurality of tasks operating in parallel in a document presentation environment while host communications and task processing may be performed asynchronously with respect to one another. A mapped resource manager manages activation (addition) and deactivation (deletion) of resources shared by a plurality of tasks operating in parallel to assure that each task may continue processing with a consistent set of files as resources despite changes made by other tasks or by operator intervention.

16 Claims, 9 Drawing Sheets

METHODS AND SYSTEMS FOR EFFICIENT USE AND MAPPING OF DISTRIBUTED SHARED RESOURCES

BACKGROUND

1. Field of the Invention

The invention relates generally to methods and systems in which resources are shared by multiple processes and more specifically relates to improved methods and apparatus for efficiently managing and mapping shared resources for use by multiple tasks operating in parallel in a document presentation environment.

2. Discussion of Related Art

In a variety of the document presentation systems such as printing systems, it is common to utilize a plurality of tasks operating concurrently or substantially in parallel to process document data for purposes of generating the output presentation data. The output presentation data is then applied to an appropriate presentation device such as a display or a printing system. In processing the document data, the plurality of tasks each perform some portion of the processing of the entire document or collection of documents. The multiple tasks may be operable concurrently sharing processing time of a number of processors or may be operable in parallel each with a dedicated processor. Such concurrent or parallel processing improves performance of presentation systems in generating the ultimate presentation data output.

It is common in such multi-tasking environments (whether concurrent or parallel) that the plurality of tasks share access to one or more common resources. Shared resources may include files containing font glyph data, image data, color profile data, text data, presentation control commands, graphics data, barcode data, overlay data, segment data, saved page data, etc. The shared resource may be updated or revised in some manner in the midst of processing a large presentation. For example, a vendor generating a large presentation of invoices to customers may prepare some invoices with a first payment address and other invoices with a different payment address (e.g., an east coast payment processing center versus a west coast payment processing center). The payment address may be defined in a shared resource file used by multiple of the plurality of tasks in processing their respective portions of the total presentation. A first version of the payment address shared resource may be provided as west coast customer invoices are prepared and a second version may be provided when east coast customer invoices are prepared. Or for example, a font or logo image (or any other type of resource) may be changed, added, or deleted as the large presentation is being processed.

When multiple tasks share access to such a common resource, some mechanism must be provided to coordinate access to the shared resource as it may be modified asynchronously during processing of the multiple tasks. Presently known techniques may provide for a form of synchronization to assure that one task using a first version of a shared resource completes its processing before the shared resource is updated by any asynchronous event for use by other tasks. Such synchronization imposes a degree of serialization on the processing thus defeating the intended purpose of distributing the processing across a plurality of concurrent or parallel operating tasks. Other known techniques may generally involve utilizing a reference counter such as may be used in common filesystems where a user registers its access to the resource and later releases that access incrementing and decrement a total number of counts in a central location (e.g., within a file server or other centralized file management system). This reference counter increases and decreases as each task may access a resource and then release its access to the resource. When the reference counter is zero indicating that no task is presently utilizing the shared resource, the resource may be updated by the external source. Such a reference counter solution gives rise to a number of problems when the usage crosses multiple computing boundaries such as in a truly parallel processing environment for the multiple tasks. These and other typical, prior solutions generally result in loss of the desired performance generally attainable by operating multiple tasks concurrently and/or in parallel distributed over a plurality of processing nodes.

It is evident from the above discussion that an ongoing need exists for improving management of one or more shared resources in a multi-tasking document presentation environment.

SUMMARY

The present invention solves the above and other problems, thereby advancing the state of the useful arts, by providing improved methods and associated systems for one or more shared resources accessed by a plurality of tasks running concurrently and/or in parallel in a document presentation environment that avoid the performance loss of prior solutions that imposed a degree of serialization on the processing. Features and aspects hereof provide for retaining copies of the shared resource until all use of the resource is completed by parallel processes. A mapped resource manager processes resource activation requests and deactivation requests to maintain a mapping table and a deactivation queue to manage access to and deletion of shared resources without forcing synchronization on the otherwise parallel operating tasks processing units of work for the data stream.

In one aspect, a method (and associated computer readable medium) is provided for parallel processing of a datastream representing document data to be presented to a user. The datastream uses resources shared by parallel processors. The method includes receiving a datastream comprising a sequence of objects and analyzing the received datastream. The analysis includes dividing the datastream into a plurality of units of work (UOWs); identifying resources available for processing each UOW; and loading the identified resources into files of a filesystem. The method then includes distributing each UOW to a task operable on an available processor of a plurality of processors for processing to generate corresponding presentation data from the UOW wherein multiple tasks operate in parallel and wherein all tasks share access to the files of the filesystem. Next, the method includes re-sequencing the presentation data generated by each task into a proper sequence based on the sequence of objects regardless of the order in which the plurality of tasks are completed. The re-sequenced presentation data is then presented to a user on a presentation device. Lastly, the method includes deleting a file storing a resource used by a UOW only after the presentation data generated by processing of all UOWs that use the files is presented to a user.

Another aspect hereof provides a method for managing resources used by a plurality of tasks operating in parallel on multiple processors to process a host supplied

DETAILED DESCRIPTION OF THE DRAWINGS

FIGS. 1 through 9 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
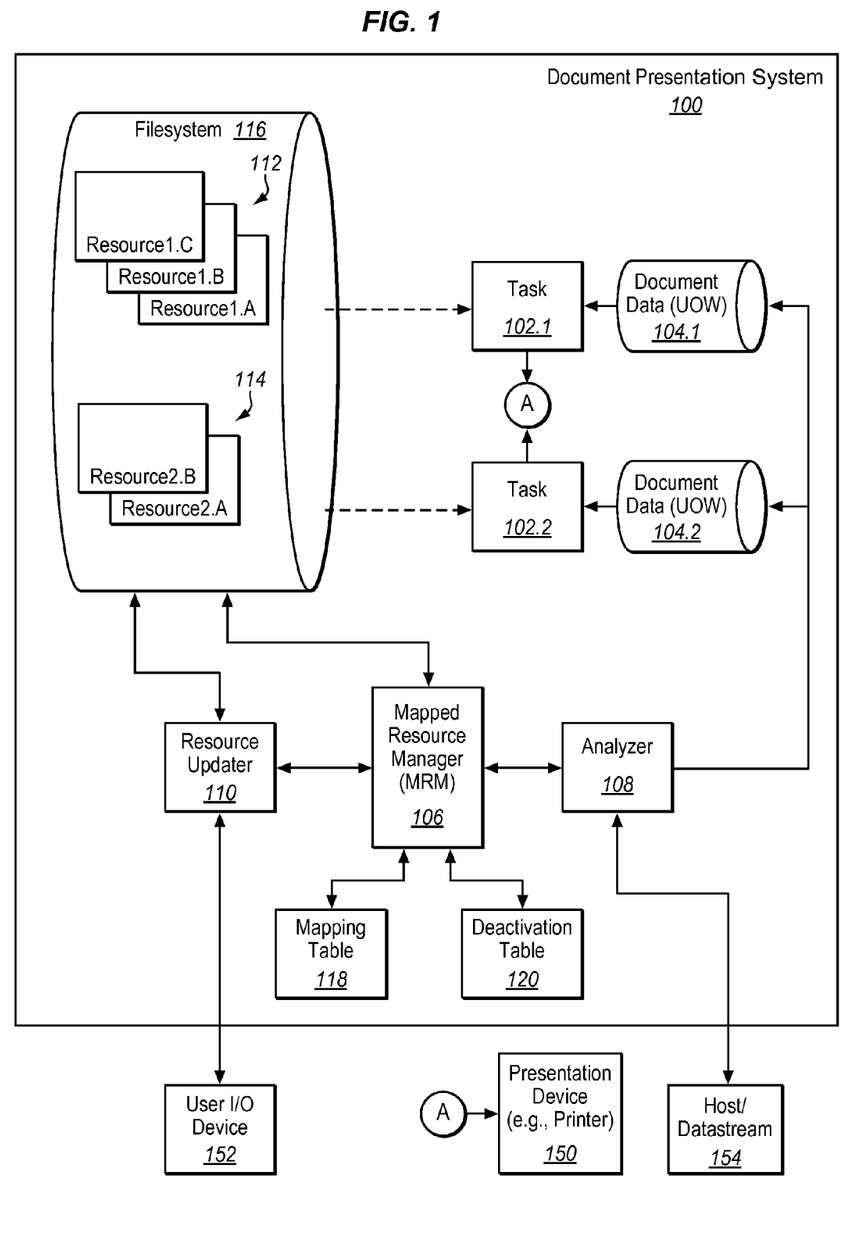
FIG. 1 is a block diagram of an exemplary document presentation system providing a mapped resource manager (MRM) and related elements to improve management of resources used by multiple tasks operating in parallel within the document presentation system.

FIG. 1 is a block diagram of a document presentation system 100 for generating presentation data from document data provided to the system. The generated presentation data may then be applied to an appropriate presentation device 150 coupled to system 100 for further utilization. Presentation device 150 may be, for example, a display, a printing system, or any other suitable presentation device to present the document to a user. Datastream 154 is received by system 100 and processed to generate the presentation data for application to presentation device 150.

System 100 includes a mapped resource manager (MRM) 106. MRM 106 coordinates access by the multiple tasks (102.1 through 102.2) to a plurality of shared resources 112 through 114 stored within a filesystem 116. More specifically, MRM 106 helps assure that each task 102.1 through 102.2 may continue its respective processing utilizing a consistent version of a common, shared resource while resource updater 110 or analyzer 108 may modify or update the resources asynchronously with respect to processing of the plurality of tasks. Resource updater 110 may determine updates (additions, deletions or modifications) to be applied to resources 112 through 114 based upon user input through user I/O device 152 or by any other suitable mechanism for providing updated shared resource information. Analyzer 108 may activate and deactivate (add and delete) resources 112 through 114 in response to directives (e.g., commands, orders, data, etc) in the datastream 154

MRM 106 may receive messages or signals from analyzer 108 indicating that processing of the datastream 154 requests activating or deactivating an identified, named resource for use in processing some portion of the data. In like manner, MRM 106 may receive activation or deactivation messages or signals from resource updater 110 indicating that a user (i.e., an operator) wishes to add, delete, or modify an identified named resource. Activation or deactivation requests from an operator will be asynchronous with respect to any processing of the datastream. Activation request messages indicate to MRM 106 that the analyzer 108 has determined that processing of a portion of the datastream may access the shared resource identified by the shared resource name included in the activation request message. It may be noted that an activation request, whether from an operator request or from a datastream directive, does not imply that the identified resource must be used in processing of the portion. Rather, it is merely an indication that the identified resource should be made available for possible use in processing the associated portion of the datastream.

As discussed further herein below, analyzer 108 analyses or parses the incoming data stream 154 from a host and divides it up to generate a plurality of units of work (UOWs). A UOW may be any useful division or portion of the datastream document data. In a preferred embodiment, each UOW includes that portion of the datastream that defines the content of a single side of a document page—i.e., a "sheetside". However, in other embodiments as a matter of design choice, a UOW may include more or less data than a single sheetside or may entail other forms of dividing or apportioning the datastream such as dividing the work among different PDL processors or based on the type of graphical objects to be generated (e.g., text, versus image data, versus line art, etc.).

Each unit of work 104.1 through 104.2 is assigned to a corresponding task 102.1 through 102.2 each operable on a corresponding processor such that multiple tasks 102.1 through 102.2 may operate in parallel. Exemplary details of operation of analyzer 108 are presented herein below. Since analyzer 108 or resource updater 110 may each generate a message or signal for MRM 106 indicating that a named resource has been changed in some manner (i.e., added, deleted, or modified) and since tasks 102.1 through 102.2 may operate asynchronously with respect to these changes in the available resources 112 and 114, MRM 106 helps assure that each task 102.1 through 102.2 may maintain a consistent snapshot of resources available for completing the processing of the assigned UOW 104.1 through 104.2. MRM 106 records information in mapping table 118 and deactivation table 120 to assure that each task 102.1 through 102.2 is assured consistent use of resources presently active when each task began processing and throughout the processing of each task on an assigned UOW. In general, this is accomplished by storing newly added resources to new files with a new file name such that the earlier file name used by any task operating prior to the requested update may continue to be used by that operating task until the task completes its assigned processing. Further, deletions of a resource, though confirmed by a response to any requesting host system or operator, is deferred until all tasks that may utilize the resource to be deleted or deactivated have completed their respective processing. A modification or change to a resource may be viewed simply as an addition of a new version of a resource followed by a deletion of the old version of a resource and thus is handled as noted above as a corresponding addition and deletion of a resource.

For example, an initial version of "Resource1" 112 may be stored in a file having a name "Resource1.A". A subsequent update to resource 112 may then be stored in a new file named "Resource1.B"). In like manner, yet another subsequent update to resource 112 may be stored in a file named "Resource1.C"). An initial version of "Resource2" 114 is stored in a file named "Resource2.A" and a later provided update of that resource is stored in a file named "Resource2.B". The file names chosen above are merely exemplary and need not include such an explicit reference to a "version number" or index. Rather, the effect of operations by MRM 106 using its mapping table 118 and deactivation queue 120 create this versioning effect. In fact, the file names may be essentially random since the mapping table will map the resource name to any other assigned name for the file that stores the resource. So long as it is assured that a previous version of a resource will not be removed, despite the presence of a new version of the resource, until all usage of the earlier version is complete.

By way of example, analyzer 108 may detect a resource activation request in the datastream portion that comprises UOW 104.2. The activation request may provide, for example, inline data to define the content of "Resource1". This activation may occur during a period of time that "Resource1.A" is the current version of resource 112 and is in use by task 102.1 to process UOW 104.1. MRM 106 therefore adds an entry to mapping table 118 to make the association between the UOW 104.1, the named, shared resource provided in the activation request (e.g., "Resource1"), and the file name containing the new version of the named resource (e.g., "Resource1.B"). MRM 106 then assures that "Resource1.A" will remain intact and available in filesystem 116 so long as task 102.1 continues to utilize the shared resource 112. While task 102.1 may continue to utilize the earlier version "Resource1.A", task 102.2 may commence processing of its assigned UOW 104.2 using the updated version "Resource1.B".

Further, by way of example, UOW 104.1 may activate "Resource2" (a persistently stored resource in the system) and then deactivate it such that the resource would be deleted from the filesystem. However, UOW 104.2 may also wish to activate the same resources for use. Because the two UOWs may be processed in parallel, the deactivation of "Resource2" by UOW 104.1 should be precluded from deleting the resource so that other tasks operating in parallel will still have access to the same resource. MRM 106 in conjunction with analyzer 108 allows for such shared access to a resource by deferring deletion of the shared resource until the last of the UOWs utilizing the shared resource completes its processing. Still further, in the case of such a deferred deletion of the shared resource, a report or status is returned to the host system that generated the deactivation request prior to the actual deferred deletion of the shared resource. Since the status/report is sent prior to the actual, physical deletion of the resource, the host will not force undesired synchronization by unduly delaying transmission of the remaining datastream until a confirmation of the deletion is received. Since the confirmation (report/status) is returned as quickly as possible without actually waiting for all use of the shared resource to conclude, the host will continue sending data that may be coded to await confirmation of the deletion/deactivation.

Those of ordinary skill in the art will readily recognize that the various elements of system 100 may be operable within a single computing system or may be distributed over any suitable number of networked computing systems and devices. For example, where the document presentation system 100 is a printing system and provides for printing of documents, processing of the plurality of tasks 102.1 through 102.2 as well as that of analyzer 108, resource updater 110, and MRM 106 may be localized within a print services facility (e.g., a print server), may be localized within a print controller of a printing system, and/or may be distributed over a network of cooperating print server facilities and associated printing system controllers. A presumption of system 100 is that there exists some degree of parallel processing applied to the processing of each UOW 104.1 through 104.2 and hence the need addressed by features and aspects hereof to assure consistent, continued access to shared resources without requiring strict synchronization or serialization of the processing.

Figure 2:
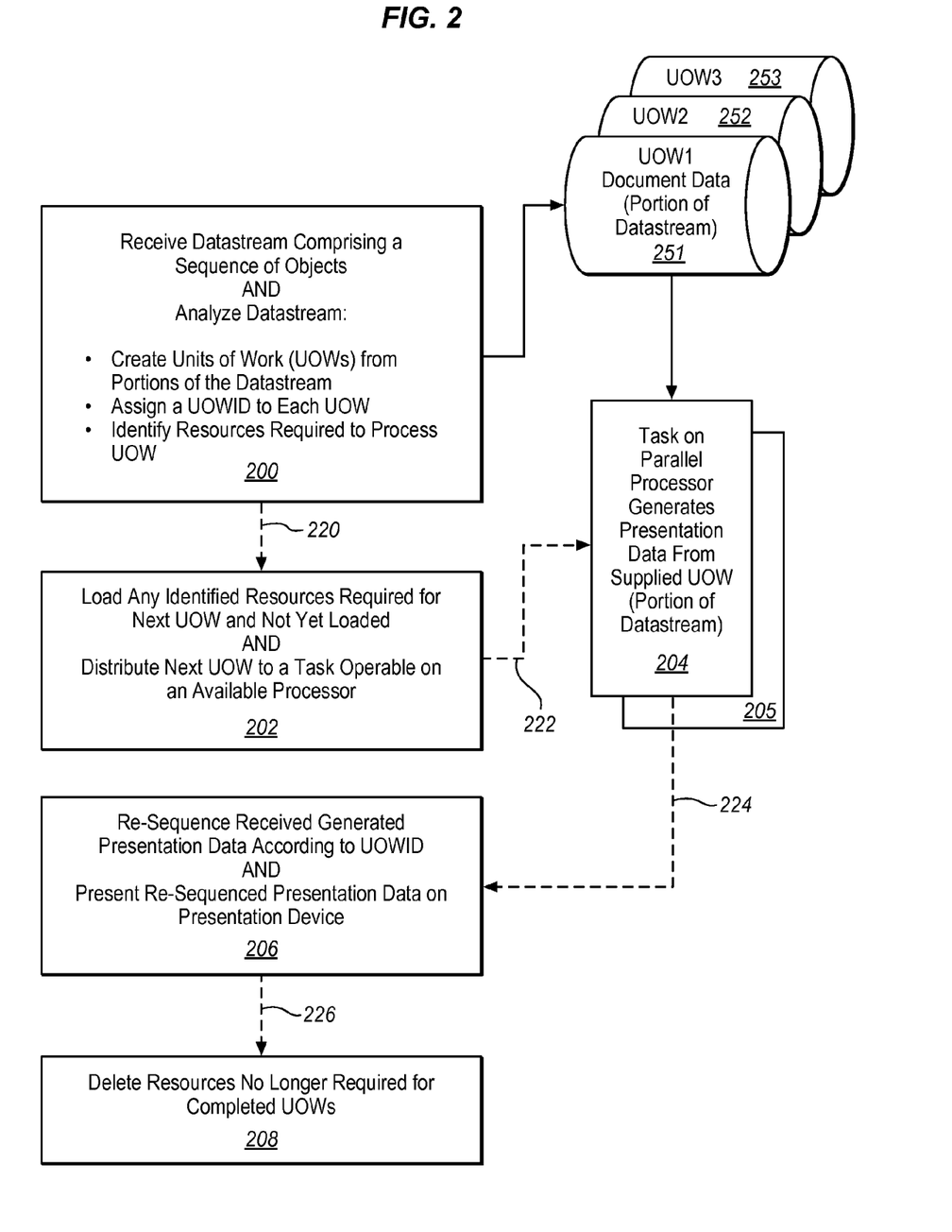
FIG. 2 is a flowchart describing an exemplary method in accordance with features and aspects hereof to improve management of resources shared by multiple tasks in a document presentation environment without forcing performance hindering synchronization.

FIG. 2 is a diagram describing exemplary methods in accordance with features and aspects hereof to manage a resource shared in parallel processing of a datastream so as to avoid synchronization and serialization of all processing. FIG. 2 combines aspects of a flowchart describing method steps and aspects of a data flow diagram indicating exchange of information between processing elements. In addition, FIG. 2 expresses aspects of an exemplary embodiment in which several of the processing steps are performed concurrently and/or in parallel through well-known multi-tasking programming techniques. For example, some of the processing elements of FIG. 2 may be implemented as threads of a common task and/or may be implemented as distinct tasks operating on one or more processors substantially in parallel.

Step 200 represents processing of the system (e.g., analyzer 108 and MRM 106 of system 100 of FIG. 1) to receive a datastream from an attached host system and to analyze the datastream to divide it into multiple UOWs. In general, the datastream comprises an ordered sequence of objects including data objects/directives describing the content of a document image as well as control objects/directives describing control aspects relating to generation of document images from the datastream. Step 200 subdivides the datastream to create multiple UOWs each corresponding to some portion of the datastream. As noted above, in an exemplary, preferred embodiment, each UOW corresponds to the data and control directives used to generate a single sheetside in the document to be presented. Alternatively, a UOW may include multiple sheetsides. Multiple sheetsides may be grouped as a subset of sequential sheetsides, as front-side sheetsides versus back-side sheetsides, etc. Further by way of example, a first UOW may include datastream objects relating to a first page description language (PDL) and other UOWs may correspond to data objects of the datastream corresponding to other PDLs. These and other equivalent variations for dividing the datastream into UOWs will be readily apparent to those of ordinary skill in the art as a matter of design choice.

Step 200 also assigns a unique identifier to each UOW (a UOWID). Preferably the UOWID values are a monotonically increasing index value representative of the order in which the UOWs were created from the incoming data stream. As will be discussed further herein below, this monotonically increasing index value is used as an identifier for each UOW for later reconstruction of the generated presentation data to assure that the document is presented in the proper order as originally intended by the sequence of objects in the datastream. In an exemplary preferred embodiment, the UOWID is a sheetside index value starting at an initial value (e.g., 0 or 1) and monotonically incrementing for each sheetside defined by the data in each UOW.

Step 200 next parses the data of each UOW to identify resources available for processing each UOW. As noted above, such resources may be activated and/or deactivated by objects/directives within the datastream (e.g., within the UOW). This step may, for example, add entries to a mapping table as each new resource is activated by the objects of the UOW. Each time the mapping table is changed (e.g., by activation or deactivation parsed in the datastream) a copy of the updated mapping table is added as meta-data to the data defining the UOW. The processing of step 200 generally creates UOWs (e.g., 251 through 253—each with its saved copy/copies of the mapping table identifying resources available for processing the UOW) and buffers/saves the UOWs until they are eventually distributed to parallel processing tasks. Dashed line 220 represents a signal from step 200 to another thread/task that will distribute the created UOWs (251 through 253) to available processors.

Step 202 is processing of another thread or task responsive to receiving a signal 220 from step 200 indicating that at least one UOW has been created and is saved in appropriate buffers (e.g., 251 through 253) ready for distribution to an available processor. Step 202 identifies an available processor (204 through 205) and assigns the next buffered UOW (a next one of 251 through 253) to a next available processor. If no processor is presently available, step 202 (e.g., as an independent thread) waits until a processor is freed following completion of some earlier UOW processing. Dashed arrow 222 indicates initiation of a task operable on an available processor to process an assigned next UOW. Step 202 continues to operate as a thread or task such that each time a processor (204 through 205) becomes available, step 202 determines whether another UOW (251 through 253) is ready for distribution to that available processor and thus, multiple such tasks operating on a plurality of processors may be processing multiple UOWs in parallel.

Dashed arrow 224 signifies generated presentation data output from the processing of the tasks operating in parallel on multiple processors 204 through 205. Step 206 is therefore another task or thread that is awaiting receipt of the generated presentation data output from processing of the UOWs. Step 206 re-sequences the presentation according to the order defined by the UOWID assigned to each UOW. Since the UOWs are processed in parallel, the order in which the presentation data is generated at the may differ from the original order in which the sequence of data objects were received in the datastream. Re-sequencing using the UOWID assures that the presentation data output is restored to the proper order corresponding to the original sequence in which the data objects of the datastream were received. Step 206 also applies the re-sequenced presentation data to the presentation device so that the document is presented to a user.

Re-sequencing as used herein means that step 206 looks for presentation data results from processing of the UOWs in the order of the UOWID. If results from UOW "N" is needed next but results from UOW "N+2" is provided first because of the parallel processing features, the later presentation data is saved in a buffer until the preceding data is received. The earlier data when received is forwarded (applied) to the presentation device and the buffered/saved data from the later UOW ("N+2") is applied to the presentation device in the proper sequence.

As noted above and as discussed further herein below, actual, physical deletion or deactivation of a resource is deferred until the UOW in which the resource was deleted or deactivated completes its processing. As used herein, completion of a UOW refers to presentation of the corresponding generated presentation data on the presentation device. For example, where the presentation device is a printing system, completion of a UOW means that the corresponding presentation data (e.g., sheetside) has been successfully printed on the printing system. Dashed line 226 therefore represents a signal or message generated by operation of step 206 to signal step 208 (another task or thread) that a particular UOW has completed processing. Preferably, the message may contain the UOWID to indicate the identity of the UOW that has just completed.

As discussed further herein below, step 208 may entail inquiring of a deactivation queue which resources are to be deactivated/deleted upon completion of which UOW. Thus step 208 receives a signal or message indicating completion of a particular UOW with reference to the UOWID. Using the UOWID received in the signal or message of completion, step 208 will determine all resources that may now be deleted based upon completion of the identified UOW.

Processors 204 through 205 as discussed above perform the processing of each task to generate presentation data from an assigned UOW. As noted above, each UOW includes a saved copy of the one or more mapping tables so that the resources loaded at the time the task was initiated are maintained as accessible through those mapped file names until the task is completed. Changes to the resources as stored in the filesystem do not require performance robbing synchronization to impose serialized or sequential processing on the datastream. Rather, parallel processing features hereof may be employed to maintain continuous processing of UOWs using multiple parallel processors in the presentation environment. In like manner, as discussed further herein below, responses returned to attached host systems or operators in response to directives to delete or modify a previously stored resource may be sent immediately when the directive is encountered. The mapped resource management features and aspects hereof will ensure that any presently processing UOWs will complete their processing with consistent access to the files storing the resources in accordance with the saved mapping table(s) associated with each UOW. In other words, a host response may be returned to allow the host application to continue forwarding data before the identified resource is actually deleted in compliance with the host's directives in the datastream. Mapped resource management features hereof ensure that the resource will be deleted later thus enabling still further parallel processing without requiring serialization of the processing to synchronize with the host systems.

Figure 3:
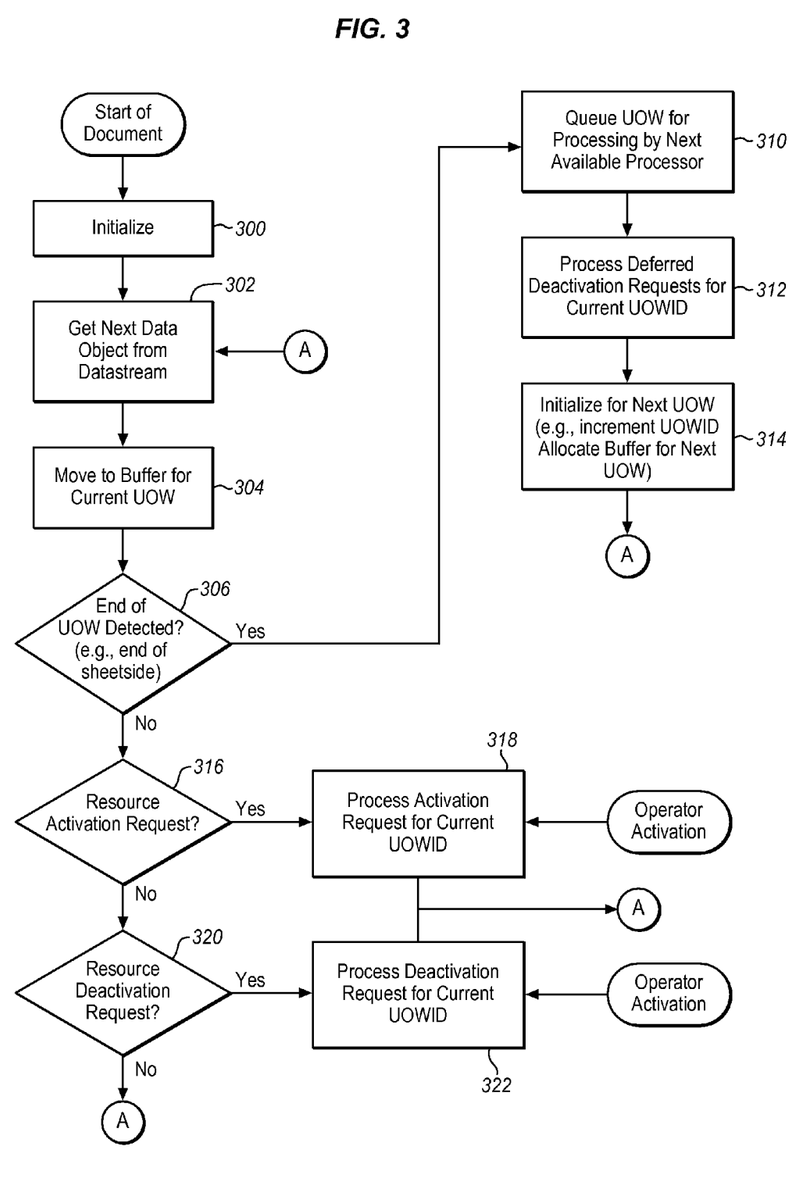
FIGS. 3 through 7 are flowcharts providing exemplary additional details of features discussed above with respect to FIG. 2.

FIGS. 3 through 7 are flowcharts providing exemplary additional details regarding aspects of processing in the method of FIG. 2. In particular, FIG. 3 is a flowchart describing exemplary additional details of the creation and analysis of UOW as described above in FIG. 2. Step 300 performs any required initialization to create and analyze UOWs from the datastream. In general such initialization may entail resetting the UOWID to a suitable initial value, deleting any resources left over from prior document processing, etc. Following such initialization, a first UOW is ready to be created and analyzed. The first UOW will be associated with the current reset value of the UOWID and appropriate buffer space will be allocated to create and save the newly defined UOW. Step 300 preferably includes copying the current mapping table to the first UOW buffer as a starting point for the mapping table of the next UOW.

Step 302 gets the next data object from the datastream. Step 304 copies or moves the next data object into the buffer storing the current UOW. Step 306 next determines whether the data object signifies the end of a UOW (e.g., the end of the sheetside in one preferred embodiment). If so, processing continues at step 310 to queue the UOW (with its embedded mapping table meta-data) to await processing by the next available processor.

As noted above, other tasks or threads may be signaled when a next UOW is queued and ready for distribution. In preparation for processing the next UOW, step 312 processes deactivations deferred during the analysis and creation of the present UOW. In general, resources that are activated and deactivated within by directives within the UOW, the actual deactivation may be deferred until the end so that the mapping table represents the accumulated resources used by any processing of the entire UOW. In one exemplary preferred embodiment, deactivation requests are not allowed within the data objects comprising the UOW but rather must appear only immediately after an object defining the end of a UOW (i.e., at the beginning of a next UOW). Thus, in this exemplary preferred embodiment, step 312 may be unnecessary since architectural restrictions in that environment assure that all the activations of resources will occur at the beginning of a next UOW prior to any substantive data objects or activation requests for other resources.

Step 314 then increments the UOWID, allocates buffer space for a next UOW, and performs any other requisite initialization to prepare for processing of the next UOW (i.e., copying the current mapping table to the next UOW buffer as a starting point for the mapping table of the next UOW). Processing continues looping back to step 302 to get the next data object from the datastream and begin creation and analysis of the next UOW.

Where step 306 determines the next data object is not the end of the current UOW, steps 316 and 320 next determine whether the data object being analyzed represents a resource activation request or a resource deactivation request, respectively. If the current data object is neither an activation nor deactivation request, processing continues looping back to step 302 to continue creating and analyzing the current UOW. If step 316 detects a resource activation request, step 318 performs appropriate processing as discussed further herein below. If step 320 detects a resource deactivation request, step 322 performs appropriate processing for the deactivation request as discussed further herein below. In both cases, processing continues looping back to step 302 to get the next object and continue creation and analysis of the current UOW.

Also shown in FIG. 3 are operator requests for a resource activation or deactivation request. Such an operator request for activation or deactivation may be performed asynchronously with respect to any processing of the system but none the less performs similar processing as indicated by step to 318 and 322 responsive to such operator requests. As noted above, in accordance with the parallel processing features and aspects hereof, the operator request need not force serialization or synchronization of the processing. The mapped resource management hereof can process the operator's resource activation and deactivation requests in a manner similar to that of a data object within the datastream without degrading the parallel processing features enabled by features and aspects hereof.

Figure 4:
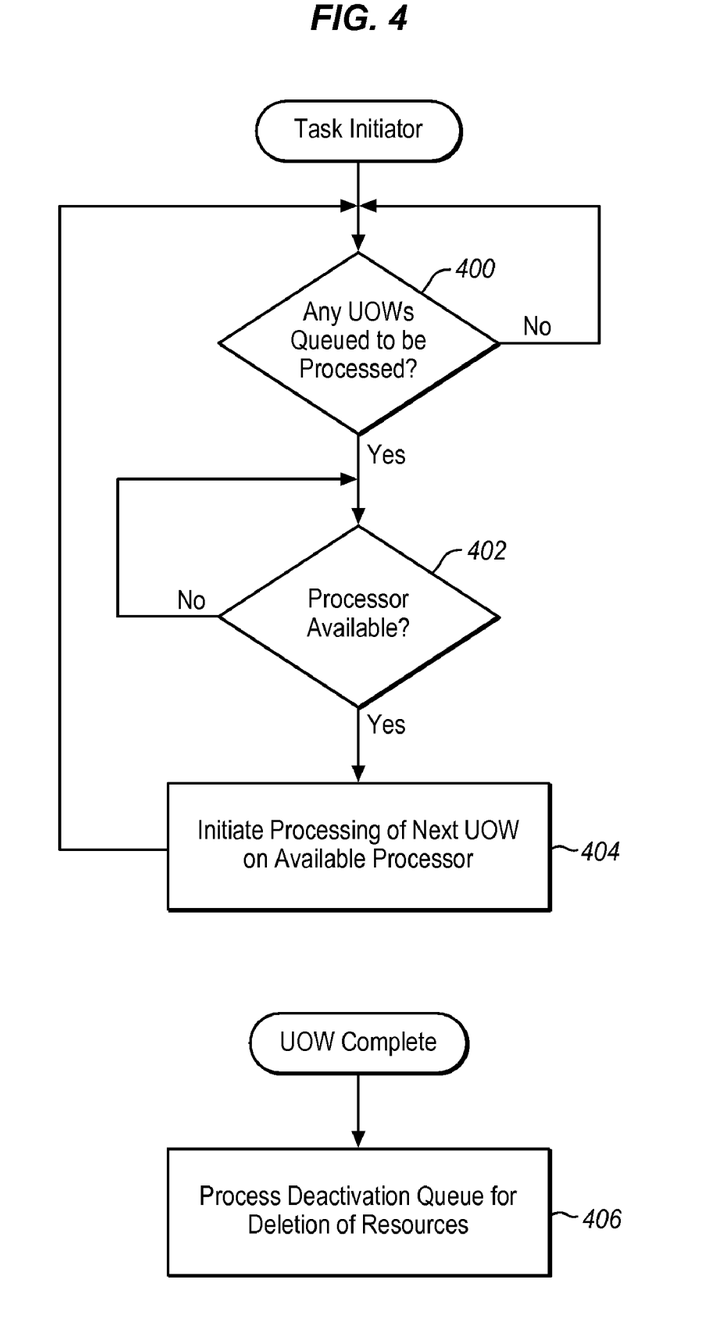

FIG. 4 provides flowcharts of other exemplary additional details of other steps discussed above with respect to FIG. 2. Steps 400 through 404 represent the thread or task discussed above in FIG. 2 that responds to availability of a next UOW ready for processing and distributes the next UOW to the next available processor of the plurality of parallel processors. In particular, step 400 determines whether a signal has been received indicating that additional UOWs are now queued and awaiting distribution to corresponding tasks in parallel processors. If not, processing continues at step 400 awaiting receipt of such a signal that a next UOW is ready to be initiated. When a next UOW is queued and ready to be initiated, the next queued UOW ready for processing is removed from its queue position and step 402 next awaits availability of a processor of the plurality of parallel processors to perform appropriate processing for the next queued UOW. When a suitable processor is available, step 404 allocates the available processor and initiates task processing on that allocated, available processor to process a next assigned UOW. Following initiation of processing of the next UOW on the now allocated processor, processing returns to loop to step 400 to await availability of a next queued UOW. The processing of steps 400 to 404 may be implemented as another task or thread within the system of FIG. 1 awaiting a signal or message that the next UOW is queued and ready for distribution to an available parallel processor. Thus creation and analysis of further UOWs may continue limited only by the buffer space available to retain UOWs in their respective queue position by operation of the flowcharts of FIG. 4.

As noted above, deactivation or deletion in accordance with features and aspects hereof is deferred or delayed until such time as the associated UOW completes. Step 406 therefore represents another task or thread operable to await a signal or message indicating that an identified UOW has completed processing where completed means that the presentation data generated by processing of the identified UOW has been successfully presented on the presentation device. At such time, step 406 processes entries in the deactivation queue to delete any resources that are no longer useful for processing any UOW with a UOWID subsequent to (later than or higher than) this identified UOWID.

As discussed further herein below, the deactivation queue entries generally identifies a resource to be deleted as indicated by a deactivation request from an identified UOW or from a system operator of the presentation environment. Step 406 generally inspects the entries in the deactivation queue and, for each resource located in an entry of the deactivation queue and associated with the just completed UOWID, the identified resource associated therewith will be deleted if no other entries are found in the deactivation queue having a higher or subsequent UOWID. In addition, step 406 processes the deactivation queue by removing all entries in the deactivation queue for any resources associated with UOWIDs less than or equal to the UOWID of the just completed UOW. Additional details of exemplary operation of step 406 are provided herein below.

Figure 5:
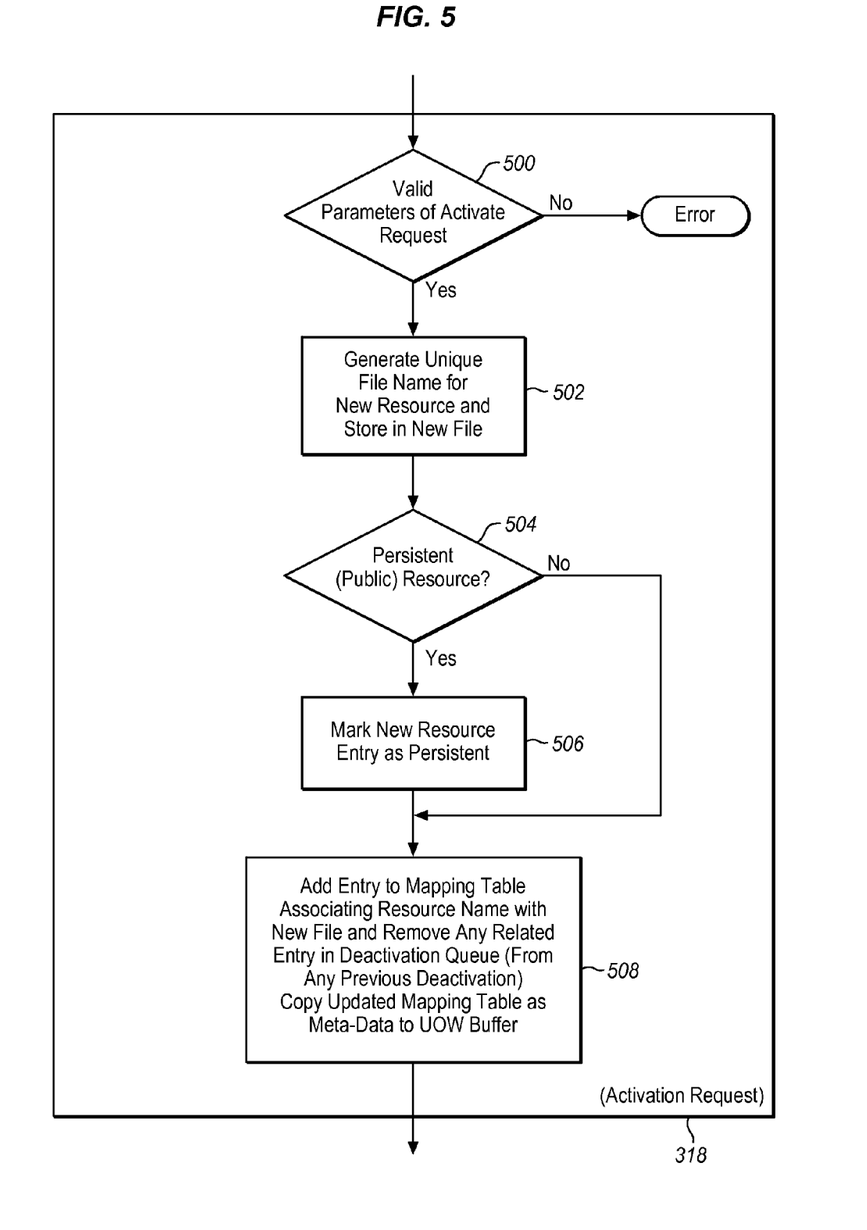

FIG. 5 is a flowchart providing exemplary additional details of the processing of step 318 of FIG. 3 to process an activation request. As noted, an activation request may be received from a system operator associated with the presentation environment or may be detected by analysis of the datastream data objects included within the UOW presently being created. Step 500 validates the various parameters of the activation request and if any error is detected appropriate error handling is invoked as well known to those of ordinary skill in the art. If the activation request parameters are valid, step 502 generates a unique file name for the new resource and stores the new resource in the newly created file. Step 504 next determines whether the newly activated resource is intended to be a persistent resource (i.e., not deleted). If step 504 determines that the resource is to be persistent or public, step 506 marks the new resource as such a persistent resource. This marking may be recorded in the mapping table entry created and stored in the next step or may be annotated in an auxiliary data structure or database so as to persistently store the type of resource as public (persistent). As noted further herein below, such persistent resources will generally not be deleted based upon completion of any single UOW. Rather, the file storage for the public (persistent) resource will be retained although the resource may be later deactivated and made unavailable. Step 508 then creates an entry in the mapping table associating the resource name as used by the UOW with the new file created to store the new resource. Further, step 508 removes any related entry in the deactivation queue left over from a previous deactivation request. If the deactivation queue has a related entry for the same resource, the fact that the entry still resides in the deactivation queue indicates that the deletion is still physically deferred and thus the identified resource has not yet been deleted. By removing the related entry in the deactivation queue, the identified resource is simply reactivated without requiring restoration of the file previously storing the resource. Lastly, step 508 copies the updated mapping table to the UOW buffer as meta-data. This allows the task later processing this UOW to detect changes to the mapping table for newly defined files as the task proceeds through the UOW data.

As noted above, activation request processing of step 318 may be performed responsive to analysis of data objects in the UOW or may be responsive to an asynchronous request generated by an operator of the presentation environment. In both cases processing continues with creation and distribution of the various UOWs until all of the datastream has been processed as discussed above.

Figure 6:
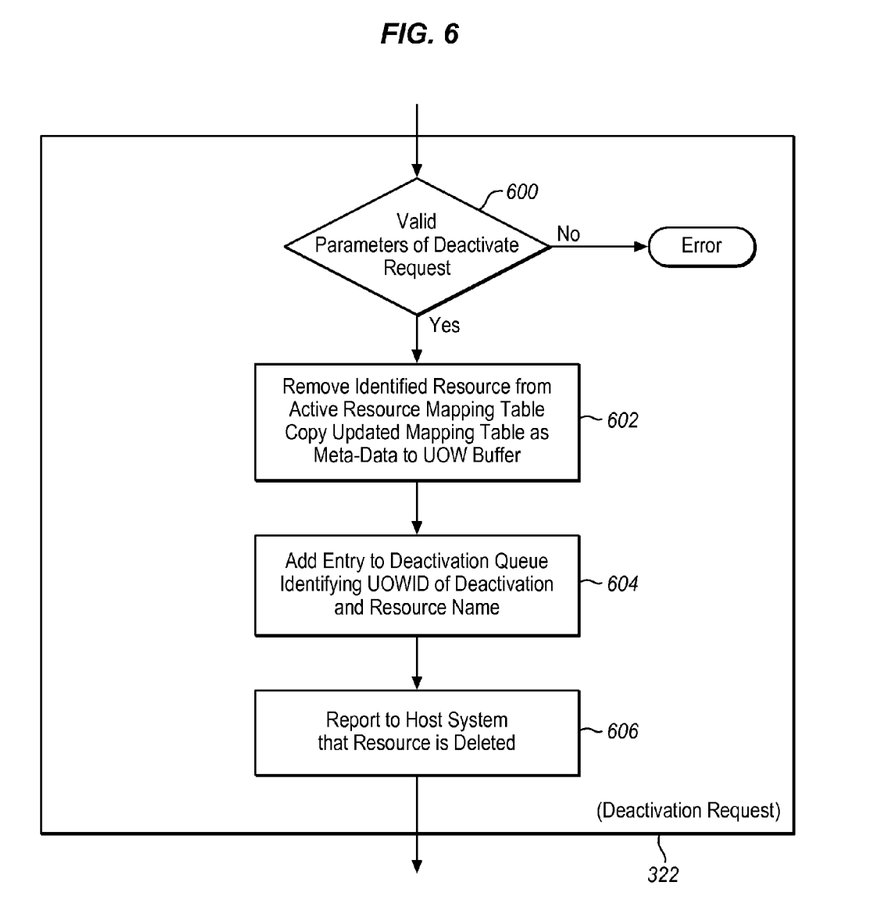

FIG. 6 is a flowchart describing additional details of the processing of a deactivation request as noted above in step 322 of FIG. 3. A deactivation request may be encountered in analysis of the datastream comprising a UOW or may be generated directly by an operator of the system asynchronously with respect to the datastream or any of the processing of the system. Step 600 first validates the parameters of the deactivation requests and invokes appropriate error processing if the parameters are invalid. The step 602 next removes the identified resource from the presently activated resource mapping table. Thus, processing of any UOWs subsequent to this deactivation will not have access to the identified resource because the mapping table will not contain the requisite mapping of the resource name to any file. Lastly, step 602 copies the updated mapping table to the UOW buffer as meta-data. This allows the task later processing this UOW to detect changes to the mapping table for newly defined files and removed associations as the task proceeds through the UOW data.

Step 604 adds the identified resource to the deactivation queue including the UOWID of the UOW presently being defined when the deactivation request is encountered as noted above. As noted above, physical deletion of the deactivated resource is deferred until the UOW corresponding to this deactivation request has successfully completed by presenting the corresponding presentation data on the user's presentation device. Upon completion of the UOW other processing discussed below may utilize the UOWID field of each entry in the deactivation queue to determine whether the completed UOW may trigger the physical deletion of an identified resource in the deactivation queue. Step 606 reports the deletion of the identified resource to any attach host system that requested a deactivation.

Figure 7:
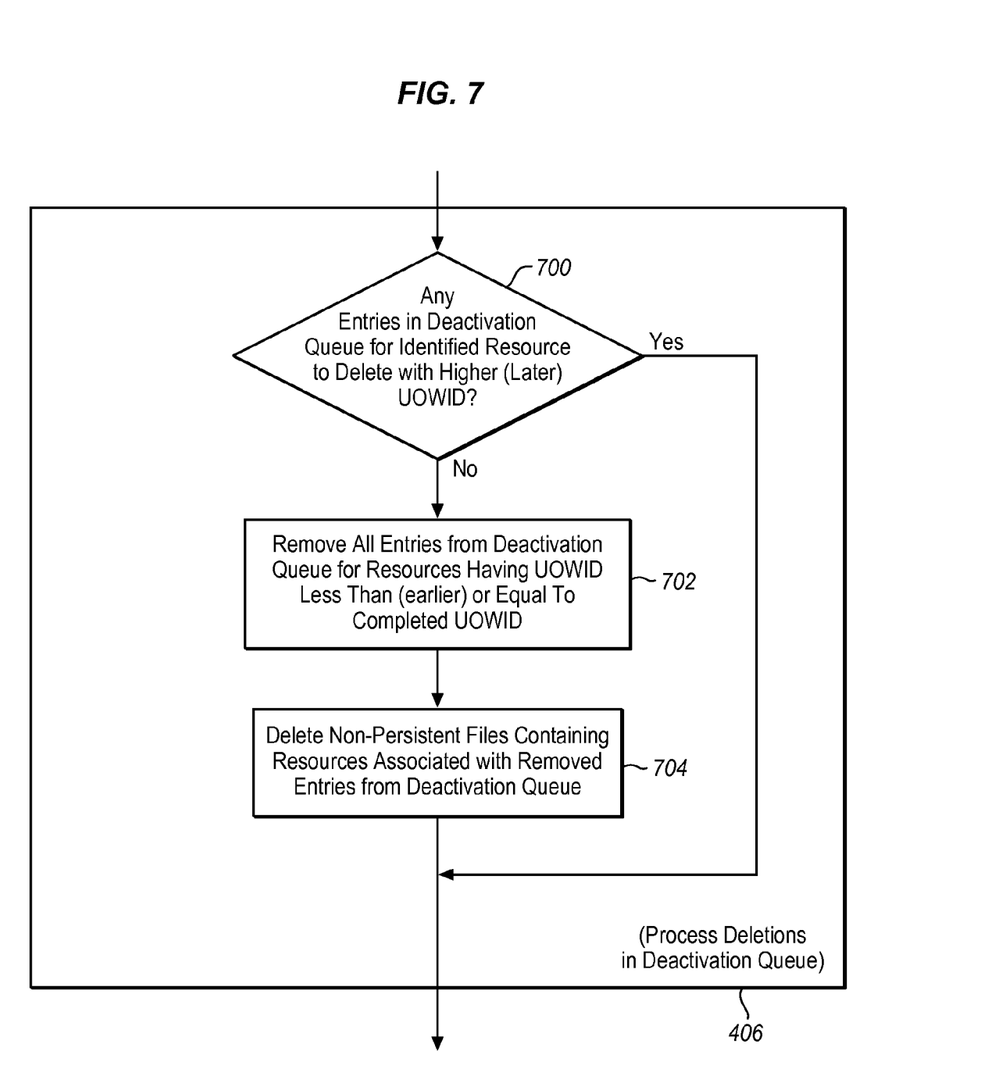

FIG. 7 is a flowchart providing exemplary additional details of step 406 of FIG. 4 to process the deletions associated with queued deactivations in response to the completion of an identified UOW. As noted above, completion requires successful presentation of the associated presentation data on a presentation device. Step 700 first determines whether any entries in the deactivation queue for an identified resource include a higher (e.g., subsequent) UOWID. As noted above, the UOWID is preferably a monotonically increasing value corresponding to the sequence in which the data objects of the UOW were received from a transmitting host. Further, the deactivation queue is preferably implemented as a queue (i.e., with a first in first out ordering) and thus the entries will be in order of the UOWIDs. Thus, if the first deactivation queue entry has a higher (e.g., subsequent or later) UOWID associated therewith, a later or subsequent UOW (subsequent to the one just completed) may still be using the identified resource and thus the deletion of the identified resource (in the first deactivation queue entry) may be deferred longer. Step 702 then removes all entries in the deactivation queue that have UOWIDs associated therewith that are equal to the just completed UOWID or less than the just completed UOWID (e.g., corresponding to the just completed UOW or to earlier UOWs that are by definition also completed). Step 704 then deletes all non-persistent files associated with the removed entries from the deactivation queue.

Figure 8:
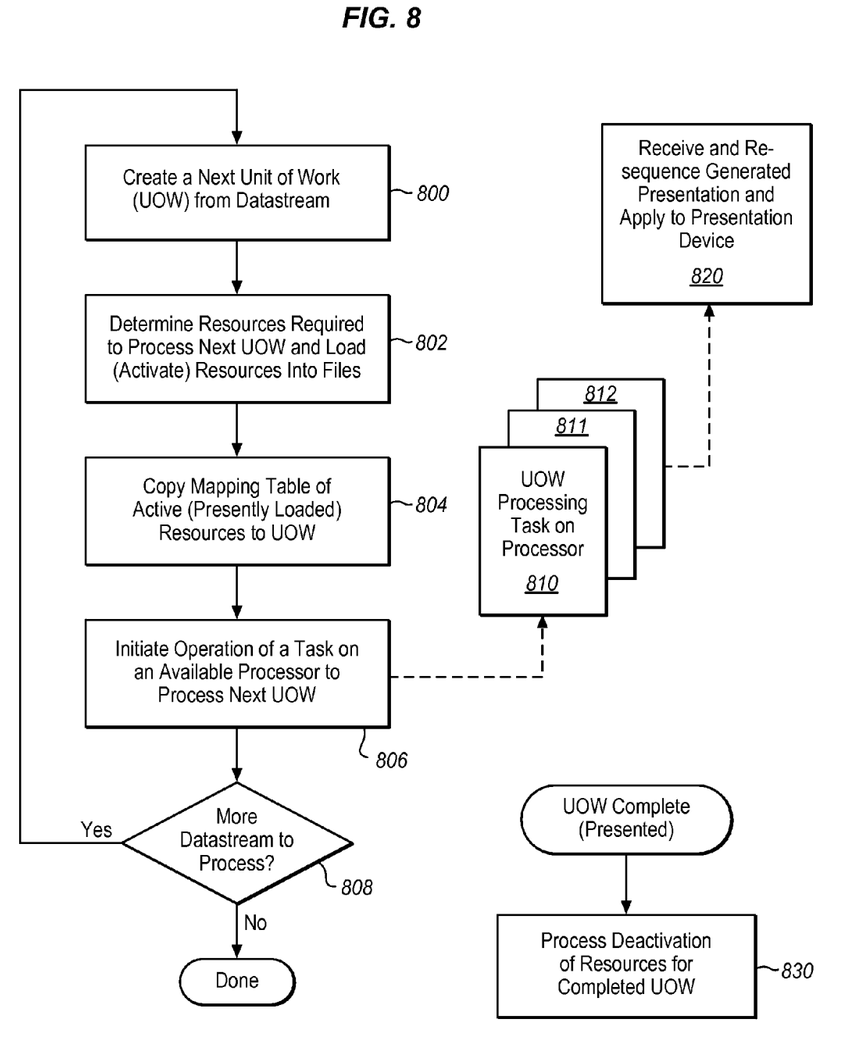
FIG. 8 is a flowchart describing another exemplary method in accordance with features and aspects hereof to improve management of resources shared by multiple tasks in a document presentation environment without forcing performance hindering synchronization.

FIG. 8 is a flowchart describing another exemplary embodiment of features and aspects hereof to manage shared resources in a presentation environment in which a datastream is processed by a plurality of tasks running in parallel on multiple processors. Step 800 creates a next UOW from the input data stream. Details of creation of a UOW are similar to those presented above with respect to FIGS. 2 through 7. Step 802 then determines the resources available for processing the next UOW just created and loads any related resources into files of an associated filesystem. Step 804 copies the mapping table as updated by the loading or activation of related resources in step 802 above. The copied/saved mapping table is then stored with meta-data associated with the UOW such that the UOW may be completely processed using the resources identified in the copy of the mapping table despite changes to the underlying original mapping table from activation and deactivation of resources by other tasks on behalf of other UOWs and/or in response to operator intervention. As noted above in FIGS. 2 through 7, multiple copies of the mapping table may be saved in the data copied to define the UOW. Each time the mapping table changes during parsing of the datastream comprising the UOW, a new mapping table may be saved as meta-data in the UOW. Step 806 initiates operation of a task on an available processor to process the next UOW just created above by operation of steps 800 through 804. The tasks so initiated are represented as tasks 810 through 812 representing multiple tasks running on parallel processors each task operable to generate corresponding presentation data from the datastream data stored in the UOW assigned to each task. The dashed line from step 806 to step 810 represents the initiation of such processing by the method. Following initiation of a task on an available processor by step 806, step 808 determines whether additional datastream data objects remain to be processed by incorporation in a next UOW. If so, processing loops back to step 800 to define a next UOW and initiate processing thereof on a next available processor.

The dashed line from the plurality of tasks 810 through 812 to step 820 (discussed below) represents application of the generated presentation data output from processing of each task on its corresponding processor 810 through 812. Referring again to step 820, presentation data output generated by each task running in parallel on an appropriate processor 810 through 812 may be completed or generated in a sequence different than the original sequence of data objects comprising the datastream. Thus, step 820 re-sequences the generated presentation data to match the original order in which the sequence of data objects were received in the datastream. Presentation data is then applied to a presentation device for further utilization.

Figure 9:
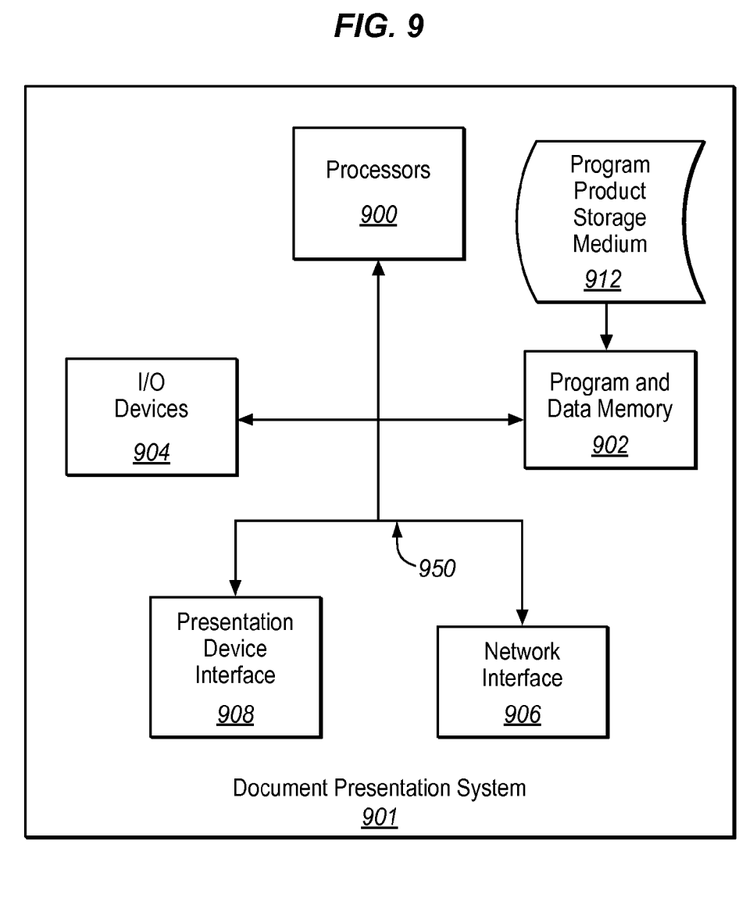
FIG. 9 is a block diagram of a system including processors to execute computer readable medium embodying programmed instruction to perform the methods hereof.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 9 is a block diagram depicting a document presentation system 901 as a system adapted to provide features and aspects hereof by executing programmed instructions and accessing data stored on a computer readable storage medium 912.

Furthermore, the invention can take the form of a computer program product accessible from a computer-usable or computer-readable medium 912 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 900 coupled directly or indirectly to memory elements 902 through a system bus 950. The memory elements can include local memory employed during actual execution of the program code, bulk storage, and cache memories which provide temporary storage of at least some program code in order to reduce the number of times code must be retrieved from bulk storage during execution.

Input/output or I/O devices 904 (including but not limited to keyboards, displays, pointing devices, etc.) can be coupled to the system either directly or through intervening I/O controllers. Network adapter interfaces 906 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 908 may be coupled to the system to interface to one or more presentation device such as printing systems and displays for presentation of presentation data generated by system 901.

Although specific embodiments were described herein, the scope of the invention is not limited to those specific embodiments. The scope of the invention is defined by the following claims and any equivalents thereof.

What is claimed is:

1. A method comprising:
   receiving a datastream representing presentation data;
   dividing the datastream into data segments;
   associating a unique identifier (ID) with each data segment wherein the IDs indicate a sequence in which the data segments were received in the datastream;
   identifying present versions of resources available for use in processing the data segments;
   initiating parallel processing of the data segments using the present versions of the resources to generate presentation data;
   generating new versions of the resources from the present versions;
   simultaneously permitting access during the parallel processing to the present versions and the new versions of the resources;
   maintaining a deactivation queue, comprising:
      receiving a signal including an ID and a resource identifier indicating that an identified resource is no longer being used for processing an identified data segment;
      adding an entry to the deactivation queue indicating that the identified resource is no longer being used for processing the identified data segment wherein the entry identifies the resource and includes the ID;
      determining from entries in the deactivation queue that no other data segments associated with sequentially later IDs use the identified resource in processing;
      deleting the identified resource from a memory used for the parallel processing in response to the determination; and
      removing one or more entries from the deactivation queue that correspond to the identified resource in response to deletion of the identified resource; and
   presenting the presentation data on a presentation device.

2. The method of claim 1, further comprising:
   determining whether a resource identified by an entry of the deactivation queue is a persistent resource, responsive to receiving a completion signal associated with the entry;
   deleting the resource, responsive to determining that the resource is not a persistent resource; and
   blocking deletion of the resource, responsive to determining that the resource is a persistent resource.

3. The method of claim 1, wherein the step of maintaining further comprises:
   determining from entries of the queue if all presentation data generated using an identified resource has been presented to the user; and
   deleting a file storing the identified resource only in response to the determination that all presentation data has been presented to the user.

4. The method of claim 1 further comprising:
   receiving a request to re-activate a resource; and
   deleting an entry from the deactivation queue that identifies the resource in order to indicate that the resource is available for use to process a next data segment.

5. The method of claim 1 wherein a resource includes one or more of: font glyph data, image data, color profile data, text data, presentation control commands, graphics data, barcode data, overlay data, segment data, and saved page data.

6. The method of claim 1 operable in a printing system wherein the step of presenting further comprises:
   printing the re-sequenced presentation data on the printing system.

7. A method for managing resources used by tasks operating in parallel on multiple processors to process a host supplied datastream in a document presentation environment, the method comprising:
   creating a unit of work (UOW) as a portion of the datastream representing a document to be presented;
   associating a unique identifier (ID) with the UOW wherein the ID indicates a sequence in which UOWs were received in the datastream;
   determining present versions of resources to be available to process the UOW;
   loading, into files of a filesystem, the resources to be available for processing of the UOW that are not already loaded into files;
   generating a mapping table associating the resources with the files storing the resources in the filesystem;
   initiating operation of a task in parallel with any other tasks previously initiated on an available processor of the multiple processors to process the UOW, wherein the task uses a saved mapping table copied at the time the task is initiated, and wherein the task uses the resources identified in the saved mapping table to generate corresponding presentation data;
   generating new versions of the resources from the present versions of the resources and loading the new versions of the resources into files of the filesystem;

simultaneously permitting access by the tasks to the present versions and the new versions of the resources;
repeating the steps of creating, determining, loading, generating a mapping table, and initiating until the all portions of the datastream are processed by the tasks wherein multiple of the tasks operate in parallel;
maintaining a deactivation queue, comprising:
  receiving a signal including an ID and a resource identifier indicating that an identified resource is no longer being used for processing an identified UOW;
  adding an entry to the deactivation queue indicating that the identified resource is no longer being used for processing the identified UOW wherein the entry identifies the resource and includes the ID;
  determining from entries in the deactivation queue that no other UOWs associated with sequentially later IDs use the identified resource in processing;
  deleting the identified resource from a memory used for the tasks in response to the determination; and
  removing one or more entries from the deactivation queue that correspond to the identified resource in response to deletion of the identified resource; and
presenting on a presentation device presentation data generated by processing of each created UOW.

8. The method of claim 7 further comprising:
receiving a resource activation message to add a new resource wherein the resource addition message is received asynchronously with respect to repeated processing by the step of repeating;
storing the new resource in a new file of the file system; and
updating the mapping table to associate the new resource with the new file,
wherein tasks initiated after the step of updating may use the new resource stored in the new file as indicated in the updated mapping table.

9. The method of claim 7 further comprising:
receiving a resource deactivation message to delete an identified resource previously stored in a first file of the filesystem wherein the resource deletion message is received asynchronously with respect to repeated processing by the step of repeating;
reporting to the host that the identified resource has been deleted wherein the step of reporting is asynchronous with respect to processing of any UOW by its corresponding task and wherein the step of reporting is prior to and independent from deleting the identified resource; and
updating the mapping table to disassociate the identified resource with any file in the file system,
wherein all tasks initiated before the step of updating will continue to use the identified resource as stored in the first file while all tasks initiated after the step of updating will have no access to the identified resource as indicated in the updated mapping table.

10. The method of claim 7 wherein the step of creating further comprises:
identifying a resource to be deactivated following the previous repetition of the step of initiating wherein the identified resource is previously stored in a first file of the filesystem;
reporting to the host that the identified resource has been deleted wherein the step of reporting is asynchronous with respect to processing of any UOW by its corresponding task and wherein the step of reporting is independent from deleting the identified resource; and
updating the mapping table to disassociate the identified resource with any file in the file system,
wherein all tasks initiated before the step of updating will continue to use the identified resource as stored in the first file while all tasks initiated after the step of updating will have no access to the identified resource as indicated in the updated mapping table.

11. The method of claim 7 wherein the step of presenting further comprises:
re-sequencing the presentation data generated from processing of each UOW into a proper sequence based on the sequence of information in the datastream regardless of the order in which the plurality of tasks are completed; and
presenting to a user the re-sequenced presentation data on a presentation device.

12. The method of claim 7 wherein a resource includes one or more of: font glyph data, image data, color profile data, text data, presentation control commands, graphics data, barcode data, overlay data, segment data, and saved page data.

13. The method of claim 7 operable in a printing system wherein the step of presenting further comprises:
printing presentation data generated by processing of each created UOW.

14. A non-transitory computer readable medium tangibly embodying programmed instruction which, when executed by a computer perform a method for parallel processing, the method comprising:
receiving a datastream representing presentation data;
dividing the datastream into data segments;
associating a unique identifier (ID) with each data segment wherein the IDs indicate a sequence in which the data segments were received in the datastream;
identifying present versions of resources available for use in processing the data segments;
initiating parallel processing of the data segments using the present versions of the resources to generate presentation data;
generating new versions of the resources from the present versions of the resources;
simultaneously permitting access during the parallel processing to the present versions and the new versions of the resources;
maintaining a deactivation queue, comprising:
  receiving a signal including an ID and a resource identifier indicating that an identified resource is no longer being used for processing an identified data segment;
  adding an entry to the deactivation queue indicating that the identified resource is no longer being used for processing the identified data segment wherein the entry identifies the resource and includes the ID;
  determining from entries in the deactivation queue that no other data segments associated with sequentially later IDs use the identified resource in processing;
  deleting the identified resource from a memory used for the parallel processing in response to the determination; and
  removing one or more entries from the deactivation queue that correspond to the identified resource in response to deletion of the identified resource; and
presenting the presentation data on a presentation device.

15. The computer readable medium of claim 14, the method further comprising:
- determining whether a resource identified by an entry of the deactivation queue is a persistent resource, responsive to receiving a completion signal associated with the entry;
- deleting the resource, responsive to determining that the resource is not a persistent resource; and
- blocking deletion of the resource, responsive to determining that the resource is a persistent resource.

16. The computer readable medium of claim 15 wherein the step of maintaining further comprises:
- determining from entries of the queue if all presentation data generated using an identified resource has been presented to the user; and
- deleting a file storing the identified resource only in response to the determination that all presentation data has been presented to the user.

* * * * *